United States Patent [19]
Hermansen et al.

[11] Patent Number: 5,965,673
[45] Date of Patent: Oct. 12, 1999

[54] EPOXY-TERMINATED PREPOLYMER OF POLYEPOXIDE AND DIAMINE WITH CURING AGENT

[75] Inventors: Ralph D. Hermansen, Northridge; Steven E. Lau, Harbor City, both of Calif.

[73] Assignee: Raytheon Company, El Segundo, Calif.

[21] Appl. No.: 08/835,671

[22] Filed: Apr. 10, 1997

[51] Int. Cl.⁶ .............................. C08L 63/00; C08L 63/02; C08L 63/04; C08K 3/36
[52] U.S. Cl. ........................ 525/523; 523/427; 523/428; 523/466; 525/486; 525/504; 525/526; 525/533
[58] Field of Search ..................... 525/486, 504, 525/523, 526, 533; 528/121; 523/466, 427, 428

[56] References Cited

U.S. PATENT DOCUMENTS

| | | | |
|---|---|---|---|
| 4,423,170 | 12/1983 | Waddill | 523/414 |
| 4,861,832 | 8/1989 | Walsh | 525/939 |
| 4,866,108 | 9/1989 | Vachon et al. | 523/428 |
| 4,886,867 | 12/1989 | Lin et al. | 528/111 |
| 5,218,063 | 6/1993 | Kimball | 525/531 |
| 5,543,486 | 8/1996 | Abe et al. | 525/504 |

FOREIGN PATENT DOCUMENTS

| | | |
|---|---|---|
| 481228 | 4/1992 | European Pat. Off. . |
| 57-167370 | 10/1982 | Japan . |
| 8-301975 | 11/1996 | Japan . |

*Primary Examiner*—Robert E. Sellers
*Attorney, Agent, or Firm*—Colin M. Raufer; Leonard A. Alkov; Glenn H. Lenzen, Jr.

[57] ABSTRACT

A solid, one-component, flexible epoxy-based composition and method for making the same are provided. The present compositions comprise: (a) an epoxy-terminated prepolymer formed by reacting at least four moles of a polyepoxide resin with approximately one mole of a diamine compound, wherein at least one of the polyepoxide resin and diamine compound is solid at room temperature, and wherein the prepolymer is rheologically stable for weeks as a single component mixture at room temperature and, and (b) a substantially stoichiometric amount of an epoxy resin curing agent selected from the group consisting of a heat-curable, latent epoxy resin curing agent and a room temperature-curable ketimine curing agent. Optional components include thixotropic agents, diluents, fillers, anti-oxidants, and processing aids. The present uncured epoxy-based compositions upon cure, exhibit a durometer Shore D of less than about 45 (or a durometer Shore A of less than about 100).

8 Claims, No Drawings

EPOXY-TERMINATED PREPOLYMER OF POLYEPOXIDE AND DIAMINE WITH CURING AGENT

TECHNICAL FIELD

The present invention relates generally to epoxy-based compositions, more particularly, to the formulation of one-component epoxy-based compositions that are solid and flexible.

BACKGROUND ART

Many industrial applications require plastic compounds which are flexible so that the plastic can tolerate various stresses without failing. For example, when a plastic adhesive is employed to bond materials having different thermal expansion coefficients and the assembly is subjected to thermal cycling, the plastic adhesive should be compliant enough to reduce the stresses in the bond joint by deforming so that high stresses are not introduced into the adherends. High modulus adhesives are known to crack brittle materials such as ceramics or to warp more deformable materials such as metals. Not only does the flexibility of a plastic adhesive serve to allow the adhesive itself to remain intact during such stress, but a flexible plastic adhesive also protects its adherends from cracking as well. In illustration, aluminum heat sinks are often bonded to silicon chips or ceramic printed wiring boards to dissipate heat. However, without a flexible bonding material, the bond itself is subject to failure as are the silicon and ceramic materials given the inherent thermal mismatch of such an assembly and the inevitable thermal cycling it will sustain.

Presently, the flexible polymer market offers a wide variety of flexible compounds, including such compounds as polyurethanes, polysulfides, and silicones. However, each of these types of plastics exhibit shortcomings in practice. Silicones and polysulfides are contaminating in many applications, are limited in diversity of formulation, and have low tensile strength, with polysulfides additionally having low tear resistance. Polyurethanes are subject to foaming and bubbling if moisture is present and have a limited upper temperature range. And none of these types of plastics is available as a solid resin, which would be suitable for use in a room-temperature stable film adhesive. Thus, a plastic compound without these attendant disadvantages would be desirable.

In comparison, epoxy-based compounds do not suffer from the above-described disadvantages attendant to polyurethanes, polysulfides, and silicones. Epoxy-based compounds are, in fact, available in solid form and offer diversity of formulation and sufficient tensile strength. Moreover, epoxy compounds demonstrate the ability to strongly adhere to a variety of materials, including metal, glass, plastic, wood, and fiber, and consequently are often used to bond dissimilar materials. Further, epoxy compounds are known to exhibit excellent resistance to attack by many corrosive chemicals. However, there are presently no commercially-available solid epoxy compounds that are at once flexible, conveniently stored, and readily curable.

Presently, epoxy-based compounds are available in two forms, namely, two-component systems or one-component systems, neither of which is both convenient to store and readily curable. Two-component epoxy-based compounds are readily curable at room temperature but are inconvenient to use and store. The components of two-component systems must be accurately measured, properly mixed, and degassed just prior to use. Thus, the various components to be mixed must be separately stored until use, and production workers are charged with the added responsibility of preparing epoxy-based adhesives having uniform properties. Not surprisingly, two-component epoxy-based compounds are not favored.

One-component epoxy-based compounds are available for industrial application in two basic forms: latent-cure epoxy compounds and frozen pre-mix, flexible epoxy compounds. These epoxy compounds are stored as a single component, requiring curing at elevated temperatures. Latent-cure epoxy-based compounds generally include Bisphenol-A resins and/or epoxy-novolacs. These rigid epoxies exhibit strong adhesion for many materials and may be conveniently stored at room temperature. However, rigid epoxy-based compounds form brittle bonds that are often insufficiently pliant for bonding dissimilar materials. For example, a brittle bond between dissimilar materials with different thermal expansion rates may be unable to withstand the stresses caused by the thermal mismatch, so that both the bond and its adherends may be susceptible to failure.

Frozen pre-mix, flexible epoxy-based compounds are also employed by industry in paste and film adhesives, although the usage of such adhesives is far surpassed by the usage of rigid epoxy adhesives. A description of frozen pre-mix, flexible epoxy adhesives is found in U.S. Pat. Ser. No. 4,866,108, assigned to the present assignee, which discloses and claims the composition behind Flexipoxy 100 Adhesive, a frozen flexible epoxy adhesive developed for spacecraft electronic applications. In comparison to rigid epoxy-based compounds, flexible epoxy adhesives form more pliable bonds that are capable of successfully adapting to stresses between dissimilar materials caused by differ- ing rates of expansion. However, in contrast to rigid epoxy-based compounds, frozen pre-mix flexible epoxy adhesives must be stored in a frozen state and must be thawed prior to use. Moreover, frozen adhesives offer a limited working life of only about 2 to 8 hours once thawed, whereas at least one week of working life is realistically required for general automated bonding operations. Therefore, frozen pre-mix, flexible epoxy adhesives in general, and frozen flexible epoxy film adhesives in particular, are widely considered impractical for use in high volume automated processing given the scheduling difficulties wrought by both the need to thaw the adhesives as well as the limited working life available after thawing.

Thus, a need remains for a one-component epoxy-based compound that is available in solid form and is sufficiently flexible such that it can withstand the rigors of varying expansion rates between bonded materials. Moreover, the epoxy-based compound should offer the convenience of room temperature storage and be readily curable.

These compounds are particularly suitable for use in room-temperature stable film adhesives.

DISCLOSURE OF INVENTION

In accordance with the present invention, epoxy-based compounds and a method for making the same are provided. These epoxy-based compounds, in an uncured state, are solid and storable at room temperature. Moreover, the present epoxy-based compounds are readily cured to produce non-brittle, flexible bonds with sufficient tensile strength for industrial applications. Accordingly, these compositions possess most, if not all, of the advantages of the above prior art compositions while overcoming their above-mentioned significant disadvantages.

The one-component, flexible epoxy-based compositions of the present invention comprise:

1. A flexible epoxy-based composition comprising a combination of the following components:
   (a) an epoxy-terminated prepolymer formed by reacting at least four moles of a polyepoxide resin with approximately one mole of a diamine compound, at least one of the polyepoxide resin and diamine compound being solid at room temperature, wherein the epoxy-terminated prepolymer is rheologically stable at room temperature and has a maximum melting point of 50° C.;and
   (b) a substantially stoichiometric amount of at least one epoxy resin curing agent selected from the group consisting of a latent epoxy resin curing agent and a ketimine curing agent, wherein the flexible epoxy-based composition exhibits a durometer Shore D of less than about 45 (or a Shore A of less than about 100).

By "flexible" is meant that the epoxy-based composition exhibits a durometer Shore D of less than about 45 (or a Shore A of less than about 100) when cured with triethylene tetramine (TETA). In comparison, semi-flexible compounds are defined as having a durometer Shore D value ranging from about 45 to 75 when cured with TETA and rigid compounds are defined as having a Shore D value exceeding about 75 when cured with TETA.

In the practice of the invention, the epoxy-terminated prepolymer may be cured with or without heat. More specifically, the prepolymer may be combined with a latent epoxy resin curing agent such that the resulting epoxy-based compound is stable at room temperature and cures readily at temperatures as low as 80° C. On the other hand, the prepolymer may be combined with a ketimine curing agent such that the curing process is conducted at room temperature. A mixture of latent epoxy resin curing agents or a mixture of ketimine curing agents may be employed in the practice of the present invention.

Aside from the polyepoxide resin, the diamine, and the curing agent, other components that may be optionally added to the present adhesive compositions include diluents, thixotropic agents, fillers, anti-oxidants, and processing additives.

The present epoxy-based compositions are prepared by reacting the polyepoxide resin component (difunctional or trifunctional) and the diamine component to form an epoxy-terminated prepolymer. The prepolymer is formed by reacting no less than 4 moles of polyepoxide resin per mole of diamine at temperatures in the range of about 80° C. for not less than 1 hour with constant stirring. Exact temperatures and duration depend on the reactivity of the polyepoxide resins being utilized. The epoxy-terminated prepolymer is then thoroughly mixed with the curing agent of choice. If a latent curing agent is employed, the mixture is cured at an elevated temperature. If a ketimine curing agent is employed, the mixture undergoes a moisture-induced cure at room temperature. Thus, the actual curing temperature employed depends on latent curative used. Each latent curative has a "threshold" temperature, below which reaction occurs very slowly or not at all. For example, Ajinomoto PN-23 and Anchor 2014 react at temperatures above 80° C., Ajinomoto MY-24 reacts above 100° C., Ajinomoto AH-122, AH-123, and AH-127 react above 110° C., Ajinomoto LDH and UDH react above 150° to 175° C. Cure times are determined by the reactivity of the polyepoxide used in the prepolymer. Generally, lower molecular-weight polyepoxide resins used in the prepolymer will produce faster-reacting prepolymers. At temperatures of approximately 150° C., most of the compounds described will cure within one hour. Ketimines react as ambient moisture perfuses through the prepolymer and break the ketimine down into a polyamine such as EDA (ethylene diamine) or DETA (diethylene triamine) and ketone (usually MIBK, i.e., methyl iso-butyl ketone). The polyamine is then free to react with the prepolymer. This reaction is limited by the rate at which moisture permeates the material, and is further limited by the thickness of the material. The farther that moisture must penetrate through the prepolymer, the slower the reaction progresses. It is unlikely that ketimine-cured systems will cure to a depth of more than ⅛inch from the nearest open surface. Cure time for ketimine-cured systems range from about 3 to 10 days, depending on the thickness of the adhesive and the hydrophobic or hydrophilic nature of the polyepoxide used in the prepolymer.

In sum, the epoxy-based compounds of the present invention are novel given that they are solid and rheologically stable for weeks or even months as a single component mixture at room temperature, readily curable, and flexible upon curing. Thus, the present epoxy-based compounds offer the best features of the prior art epoxy-based compounds without their significant disadvantages. Like the frozen, pre-mix, flexible epoxy adhesives, the present compounds form pliant bonds that withstand the stresses of thermal mismatch. Like the rigid epoxy compounds, the present compositions may be conveniently stored at room temperature and easily processed. The ability of the present epoxy-based compositions to provide strong, flexible bonds without wreaking havoc on production schedules enables industry to avail itself of the excellent qualities associated with traditional epoxy compounds and film adhesives without sacrificing the advantages of automation.

DETAILED DESCRIPTION OF THE PREFERRED EMBODIMENTS

The epoxy-based compounds of the present invention have been developed to provide industry with solid, flexible epoxy-based compounds that are storable in an uncured state at room temperature and that are readily curable. Once cured, the present epoxy-based compounds exhibit a flexibility measured at less than about 45 Shore D durometer, or less than about 100 Shore A. The minimum melting point is about 35° to 45° C., and varies little from one polyepoxide to another, depending more on the molecular weight and paraffinic nature of the diamine used. Both the low melting point and the rapid fall in viscosity after melting are unique to this class of prepolymers. They can therefore define this class from other solid epoxy prepolymers, flexible or otherwise.

The compositions of the present invention are based on the use of a combination of selected polyepoxide resins (also known as polyepoxide resins), diamines, and curing agents that will provide a flexible, solid epoxy-based product. In particular, the selection of polyepoxide resins and diamines for use in the practice of the invention is critical in obtaining the desired flexibility in the final epoxy-based product.

The purity of all components is that employed in common, commercial practice. The molecular weights given herein are in terms of weight average.

The present epoxy-based compounds are synthesized in two steps: first, an epoxy-terminated prepolymer is formulated, and second, the prepolymer is cured to form the final epoxy-based compound. The epoxy-terminated prepolymer is the product of reacting at least four moles of a polyepoxide resin to one mole of a diamine. To achieve a solid prepolymer, it is necessary that at least one of the polyepoxide resin component and the diamine component be solid at room temperature and that the liquid component should comprise less than 70% by weight of the total prepolymer. Likewise, to achieve a flexible prepolymer, the prepolymer must be flexible, which is defined herein as having a Shore D hardness not exceeding about 45 (or Shore A hardness not exceeding 100) when cured with a stoichiometric amount of triethylene tetramine ("TETA"). Thus, while a solid, flexible epoxy-based compound will result if both the polyepoxide resin and the diamine component are solid at room temperature and flexible in nature, just one of these two ingredients may impart the desired solidity or flexibility to the resultant epoxy-terminated prepolymer. For example, if one of the ingredients is solid and flexible and has an appreciably higher molecular weight that the other ingredient, the features of the ingredient having the higher molecular weight may dominate such that the resulting prepolymer is solid at room temperature and flexible in nature. Since there is at present no solid resin which will result in a solid flexible prepolymer, the diamine is the determining factor. As there must be at least four moles of epoxy (i.e., liquid) per mole of diamine (i.e., solid) and, since the amount of resin (liquid) cannot exceed 70% by weight of the total prepolymer, then the molecular weight differential must be such that the molecular weight of liquid (epoxy) must be less than one-half that of the solid (diamine). If the molecular weight of the epoxy is significantly less than one-half that of the diamine, then more than 4 moles of epoxy per mole of diamine may be used and still result in a solid prepolymer. For example, Heloxy 67 (mw 250) may be used with ED-4000 (mw 4000) at levels as high as 8 moles epoxy per mole of diamine and still result in a solid prepolymer.

Thus, the room-temperature solidity of the epoxy-terminated prepolymer may derive from either the polyepoxide resin component or the diamine component. Preferably, however, the diamine compound is solid at room temperature.

While difunctional epoxide resins are advantageously employed in the practice of the present invention, trifunctional epoxide resins may also be suitably employed. Consequently, the term "polyepoxide" is employed herein to denote both classes of epoxide resins.

The foregoing description of polyepoxide resins has been directed to flexible resins, which are defined as having a glass transition temperature ($T_g$) at or below room temperature when cured with a stoichiometric amount of TETA. However, semi-rigid and rigid polyepoxide resins may alternatively be used. Semi-rigid polyepoxide resins have a $T_g$ close to room temperature (between above room temperature and 20° C. above room temperature), while rigid polyepoxide resins have a $T_g$ much greater than room temperature (on the order of about 80° C.). An example of the former is Cardolite NC-514, while examples of the latter include Epon 825, Epon 828, Epon 836, and other Bisphenol-A and Bisphenol-F resins and most epoxy novolac resins.

Examples of diamines that are solid at room temperature include Jeffamine ED-2001 and ED-4000, which are commercially-available from Huntsman Chemical Company. Jeffamine ED-2001, which is a diprimary amine of polytetramethyl ether glycol (PTMEG) with an approximate molecular weight (weight average) of 2000, and Jeffamine ED-4000, which is a diprimary amine of polytetramethyl ether glycol (PTMEG) with an approximate molecular weight (weight average) of 4000, are waxy solids at room temperature. The waxy state of these two diamines derives from crystallinity in the tetramethylene segments of the diamine main chain. Given the relatively high molecular weights of these two diamines, their combination with liquid polyepoxides having molecular weights of less than about 500 usually yields an epoxy-terminated prepolymer that is solid at room temperature, as demonstrated by the examples below. While no examples of suitable diamines that are liquid at room temperature are known at this time, there is no reason to believe that such liquid diamines would not also be useful in the practice of the present invention.

The flexibility of the epoxy-terminated prepolymer may, like its solidity at room temperature, derive from either the polyepoxide resin component or the diamine component. The internal flexibility exhibited by suitably employed polyepoxide resin and diamines derives from such features as long aliphatic chains, ether and ester linkages in the polymer chains, and double carbon-carbon bonds, which increase flexibility by enhancing the rotation of adjacent single carbon-carbon bonds. Examples of flexible polyepoxide resins that may be suitably employed in the practice of the invention to achieve a flexible prepolymer include (1) the diglycidyl ester of linoleic dimer acid having an epoxy equivalent weight of about 430, as available from Shell Chemical under the trade designation Epon 871; (2) the polyglycidyl ether of an aliphatic polyol, which has an epoxy equivalent weight of about 650 and is commercially available from Shell Chemical Co. under the trade designation Heloxy 84; (3) the diglycidyl ether of 1,4-butanediol, which has an epoxy equivalent weight of about 130 and is available from Shell Chemical Co. of Houston, Tex. under the trade designation Heloxy 67; and (4) the diglycidyl ether of polyoxypropylene glycol, which has an epoxy equivalent weight of about 190 and is commercially available from Dow Chemical, Midland, Mich., under the trade designation DER 736. All four of these polyepoxide resins may be characterized as flexible, liquid polyepoxide resins. Hardness values (Shore A) on flexible resins cured with TETA are Epon 871/TETA=53A, Heloxy 67/TETA=80A, DER 732/TETA=60A, and DER 736/TETA=73A. It will be appreciated by those skilled in this art that, as indicated above, semi-rigid or even rigid polyepoxides may be used in the practice of the present invention and still be rendered flexible by virtue of the flexibility of the Jeffamine ED-4000. Examples include (Shore A) Cardolite NC-514 (ew=350, mw=700): NC-514/TETA=77A (difunctional epoxy of cardanol); and Shell Epon 825 (ew=175, mw=350): Epon 825/TETA=87A (diglycidyl ether of Bisphenol-A).

Examples of flexible diamines that may be suitably employed in the practice of the invention to achieve a flexible prepolymer include Jeffamine ED-2001 and ED-4000, which are commercially-available from Huntsman Chemical Company. Thus, in addition to providing the desired solidity for the prepolymer as described above, the flexible polyether backbones of Jeffamine ED-2001 and ED-4000 may also be employed to impart flexibility to the prepolymer.

Interestingly, not all resins may be employed in the practice of the present invention. For example, both Epon 1001 (mw=1000) and Cardolite NC-547 (mw=1800) do not work because their molecular weights are too high to mask their non-aliphatic nature. By the time 4 moles of resin have been added per mole of diamine, the prepolymer partakes too much of the properties of the aromatic ring structure of the resin instead of the paraffinic nature of the PTMEG diamine. The same holds true for any aromatic- or cycloaliphatic-based polyepoxide with a molecular weight greater than 1000. On the other hand, although Heloxy 84 has a molecular weight of 1950, its linear aliphatic structure allows it to be drawn into solid state by the paraffinic nature of the PTMEG diamine.

Further, not all diamines may be employed in the practice of the present invention. For example, the Polamine diamines from Air Products have a PTMEG backbone, just like the Jeffamine ED-2000 and ED-4000 diamines discussed above, and are waxy solids as well. But, because they are terminated with aromatic diprimary amines instead of aliphatic diprimary amines (like the Jeffamines), they are not usefully employed herein.

The epoxy-terminated prepolymer formulated in the practice of the invention is thus solid at room temperature and may be conveniently stored at room temperature for weeks or even months. However, it is anticipated that the convenience of a one-component epoxy-based compound will be desired. Thus, the prepolymer is combined with an appropriate curing agent to achieve a one-component system that may be cured to form a solid epoxy-based compound having a flexibility of less than about 45 Shore D hardness (or 100 Shore A hardness).

Two different types of curing agents may be employed in the practice of the invention. First, the prepolymer may be combined with a latent curative to form a room-temperature stable solid product that may be cured by exposure to an elevated temperature. Second, the prepolymer may be combined with a ketimine curing agent to form a room-temperature stable solid product that will crosslink upon exposure to moisture in the air. Prior to curing and providing there is no moisture, ketimine-cured prepolymers can be stored as a one-component system in bulk in a hermetically-sealed metal cartridge, or in bulk or film adhesive form in a heat-sealed foil-lined pouch. The particular application desired for the epoxy-based compound determines whether a latent curing agent or a ketimine curing agent is appropriate. Regardless of the nature of the curing agent employed, its addition to the epoxy-terminated prepolymer results in a room temperature stable, solid, one-component epoxy compound that may be readily cured to form a solid, flexible epoxy-based compound.

The use of latent curing agents results in a solid, one-component epoxy-based compound that may be cured by prolonged exposure to an elevated temperature. Thus, it follows that a latent curative does not operate to cure an epoxy resin until melted in the elevated temperatures of a curing process while in contact with the targeted epoxy resin. The choice for latent curing agent must be compatible with the epoxy-terminated prepolymer structure so that a flexible product is achieved from the combination. Additionally, curing agents preferably employed in the practice of the present invention should have a melting point or softening point between 60° and 150° C.

Examples of latent curing agents that may be suitably employed in the practice of the invention to achieve solid, flexible epoxy-based compounds include dihydrazide curing agents. Dihydrazide curing agents are characterized by long aliphatic moieties in their structures which allow compatibility with the synthesized epoxy-terminated pre-polymers. Examples of dihydrazide curing agents suitably employed in the practice of the invention include the following compounds available from Ajinomoto Co., Inc., of Teaneck, N.J.:

(1) aliphatic dihydrazide with Diuron accelerator (3-(3,4-dichlorophenyl)-1,1-dimethyl urea), having an active hydrogen equivalent weight of 134 as available under the trade designation Ajicure AH-122;

(2) aliphatic dihydrazide with Diuron accelerator (3-(3,4-dichlorophenyl)-1,1-dimethyl urea), having an active hydrogen equivalent weight of 91 as available under the trade designation Ajicure AH-123;

(3) adipic acid dihydrazide with Diuron accelerator (3-(3,4-dichlorophenyl)-1,1-dimethyl urea), having an active hydrogen equivalent weight of 49 as available under the trade designation Ajicure AH-127;

(4) icosanedioic acid dihydrazide ($C_{20}H_{42}N_4O_2$), having an active hydrogen equivalent weight of 92.5 as available under the trade designation LDH, with about 10% of the compound as sold being hexadecanedioic acid dihydrazide according to the Ajinomoto material safety data sheet ("MSDS");

(5) 7,11-octadecadiene-1,18-dicarboxylic acid dihydrazide ($C_{20}H_{38}N_4O_2$), having an active hydrogen equivalent weight of 91.5 as available under the trade designation UDH; and (6) valine dihydrazide, having an active hydrogen equivalent weight of 78.5 as available under the trade designation of VDH.

Preferably, AH-122 and AH-127 are employed in the practice of the present invention. Other latent curatives that may be suitably employed in the practice of the present invention include Ajinomoto PN-23, Ajinomoto MY-24, Pacific Anchor Ancamine 2014, and Pacific Anchor Ancamine 2014FG, which are solid, epoxy-amine adducts.

In general, a cure time measured in a matter of hours at cure temperatures ranging from about 80° to 160° C. is contemplated to achieve a solid, flexible epoxy-based compound from a mixture of an epoxy-terminated prepolymer and a latent curing agent.

More specifically, it is contemplated that the epoxy-based compounds will cure in about 15 minutes to 2 hours, depending on the cure temperature employed and the specific composition of the epoxy-based compound..

The use of ketimine curing agents results in a solid, one-component epoxy-based compound that may be cured by prolonged exposure to moisture in the air. Thus, while an epoxy-based compound employing a ketimine curing agent may be processed as a hot melt adhesive, it will crosslink upon prolonged exposure to humidity. The moisture-induced crosslinking of the epoxy-based compound increases its upper service temperature and increases its solvent resistance. The choice for ketimine curing agent must be compatible with the epoxy-terminated prepolymer structure so that a flexible product is achieved from the combination.

It will be appreciated that ketimine-cured systems will cure without heat. This is useful for bonding heat-sensitive parts or for energy conservation. It is also useful as a coating material. As a hot-melt material, one just bonds or coats the parts and allows the curing to proceed. There is no post-processing, and the curing is rapid, easy, and inexpensive.

Examples of ketimine curing agents that may be suitably employed in the practice of the invention to achieve solid, flexible epoxy-based compounds include Ketimine H-1, which is the ketimine of diethylene triamine and methyl iso-butyl ketone (MIBK), available from Shell Chemical Company of Houston, Tex. Other examples of appropriate ketimine latent curatives include Shell Ketimine H-2, which is the ketimine of ethylene diamine and MIBK, and Shell Ketimine H-3, which is the ketimine of MIBK and an adduct of diethylene triamine and phenyl glycidyl ether. Preferably, Ketimine H-1 is employed in the practice of the present invention.

In general, ketimines are complexes formed between amines and ketones, and react as ambient moisture perfuses through the prepolymer. Moisture breaks the ketimine down into a polyamine such as EDA (ethylene diamine) or DETA (diethylene triamine) and ketone (usually MIBK, i.e., methyl iso-butyl ketone). The polyamine is then free to react with the prepolymer. This reaction is limited by the rate at which moisture permeates the material and is further limited by the thickness of the material. The farther that moisture must penetrate through the prepolymer, the slower the reaction progresses. It is unlikely that ketimine-cured systems will cure to a depth of more than ⅛ inch from the nearest open surface. Cure times for ketimine-cured systems range from 3 to 10 days, depending on the ambient humidity, thickness of the adhesive, and the hydrophobic or hydrophilic nature of the polyepoxide and diamine used in the prepolymer.

Regardless of whether a latent curing agent or a ketimine curing agent is employed, the amount of curing agent is preferably in stoichiometric proportion relative to the epoxy-terminated prepolymer. In general, the amount of curing agent may be varied about ±15 percent from stoichiometry, with little adverse effect on the final product. The severity of adverse affects deriving from employing more or less than the exact stoichiometric amount of curing agent depends upon the functionality of the ingredients employed (e.g., resins cured at higher temperatures fare better than those cured at lower temperatures).

The particle size of the curing agent does not appear to be a factor, except perhaps with highly filled systems, in which case, more finely divided powders may be advantageously employed.

The present epoxy-based compositions may also optionally include a thixotropic agent. Thixotropic agents are used to prevent settling of the curing agent, which is in powder form and is prone to separating from the epoxy-terminated prepolymer. More specifically, thixotropic agents retard settling of the curing agent by increasing the low shear viscosity of the uncured epoxy-based compound. The thixotropic agent may comprise any of the well-known materials for this purpose, such as fine particle fillers like clays, talc and, preferably, fumed silica. The amount of thixotropic agent is that amount which is effective in producing the desired thixotropic properties of the final product, i.e., that amount which prevents settling of a solid curative in cases where the compound would remain molten prior to cure long enough for settling to take place. In filled systems or in systems with large amounts of solid curative, a thixotropic agent is not necessary. If needed at all, the concentration of the thixotropic agent would be determined by the particular application. Simple experimentation will readily determine the appropriate amount of thixotropic agent in the epoxy-based composition. The scope of experimentation required to determine the proper concentration of thixotropic agent is considered to be reasonable for those having ordinary skill in the art and is not considered to be undue.

Optionally, the present epoxy-based compounds may also include a filler component. If a filler is employed, its particle size should be considered in formulating the present epoxy-based compositions. The filler and curing agents are both solids and therefore compete for space within the composition. In addition to maximizing the resin:curative volume ratio, this potential overcrowding problem can also be overcome by selecting different particle sizes for curing agent and filler such that the smaller particle fits into the interstices between the larger particles. Conductive fillers, such as metal powders or flakes, or other conductive fillers such as carbon may be used to impart electrical conductivity to the system, when added in concentrations of 20% or higher of the total filled adhesive. Mineral fillers, such as glass, mica, alumina, or other ceramic oxides or nitrides, may be used to provide thermal conductivity or to reduce thermal expansion, or simply to reduce cost, in concentrations as high as 70% of the total volume of the filled composition.

Other optional additives to the flexible epoxy-based compositions include UV stabilizers, anti-oxidants, and various other processing aids such as wetting agents, anti-foaming agents, and dispersing agents, all of which are known and commonly used in the art. The processing aids are preferably employed at a concentration of up to 5 wt % of the total adhesive composition.

One novel feature of the invention is that the uncured combination of polyepoxide resins, diamines, and curing agents is stable at room temperature. More specifically, the uncured combination is rheologically stable for weeks or even months at room temperature, meaning that it does not cure absent an elevated temperature in the case of latent curing agents or moisture-laden air in the case of ketimine curing agents. Thus, un-like frozen, pre-mix flexible epoxy compounds, the present compositions do not require thawing prior to curing and, as such, are available for curing on an as-needed basis. The present epoxy-based compositions are readily cured, and upon cure, remain flexible and reworkable, with a durometer Shore D of less than about 45 (Shore A of less than about 100). Thus, the present epoxy-based compounds are flexible, solid one-component materials that are conveniently stored at room temperature, readily cured as needed, and capable of strong bonds between dissimilar materials that can withstand the stresses of thermal mismatch.

The present epoxy-based compounds are formulated by the following process:

(1) Melt the solid diamine at an elevated temperature, e.g., 80° C.

(2) Add liquid polyepoxide at a ratio of at least 4 moles of polyepoxide per mole of diamine. If the molecule weight of the polyepoxide is low, then excess polyepoxide may be added to increase reactivity.

(3) Place the polyepoxide and molten diamine in a closed container and heat to an elevated temperature, e.g., 150° C. while mixing continuously. After about 1 hour, the prepolymer is substantially completely formed.

(4) Adjust the temperature of the prepolymer to a lower elevated temperature, e.g., 50° C. in preparation for addition of the curing agent. The prepolymer will still be a free-flowing liquid at this point, but the temperature is too low to activate the curing agent.

(5) Add the curing agent and stir the composition to mix in the components at 50° C. under vacuum for a sufficient period of time, e.g., 30 minutes, to remove moisture and dissolved gases.

(5a) If desired or necessary to the application of the formulation, add fillers and/or processing aids at the same time as the curative and mix in under the conditions detailed above.

(6) When mixing under vacuum is complete, decant the finished epoxy compound and store it in hermetically sealed metal cartridges or in heat-sealed, foil-lined pouches until needed.

(6a) The finished composition may also be formed into a film adhesive in its molten state, either alone or with a cloth, film, or mesh carrier. The film adhesive is sandwiched between layers of plastic or coated-paper release paper. Ketimine-cured composition films are stored in heat-sealed, foil-lined pouches.

When the uncured epoxy-based compound is to be used, it must be cured. In general, the uncured compound is applied to the materials to be bonded or coated in the manner desired. Then, the compound is cured according to whether a latent curing agent or a ketimine curing agent is employed. More specifically, if a latent curing agent is incorporated in the compound, it is cured by heating the epoxy-based compound (as well as its adherends) to an elevated cure temperature. While a cure temperature as high as 175° C. may be employed depending upon the particular electronics application, the present adhesive compositions are designed to cure at temperatures ranging from about 80° to 160° C. in a reasonable amount of time (about 15 minutes to 2 hours, depending on curative and polyepoxide resin used in the composition). While cure times vary with the melting point and molecular weight of the curing agent, the cure time for the present compounds is designed to be less than about two hours at the selected temperature range. If a ketimine curing agent is incorporated in the epoxy-based compound, it is cured by exposing the epoxy-based compound (as well as its adherends) to air containing moisture for a prolonged period of time, typically a matter of 3 to 10 days.

Thus, the present epoxy-based compounds represent easily processible compounds that are at once strong, flexible, and solid in form. The examples below serve to illustrate the properties of epoxy-based compounds formulated in the practice of the invention.

EXAMPLES

Examples 1–11 represent epoxy-based compositions prepared in accordance with the present invention. Table I presents Examples 1–5, which represent epoxy-based compounds having latent curing agents, while Table II presents Examples 6–11, which represent epoxy-based compounds having ketimine curing agents. In each example, at least four moles of a polyepoxide resin were combined with about one mole of a diamine to form the prepolymer, with a description of the prepolymer being noted in the fourth column of Tables I and II. The prepolymers were then combined with 0.5 parts-by weight Aerosil R972 and the indicated amount of curative (AH-122 in Table I and the indicated ketimine in Table II) to form epoxy-based compounds in accordance with the present invention. The epoxy-based compounds of Table I were cured at a temperature of about 120° C for about 2 hours. The epoxy-based compounds of Table II were cured in air for several days having a humidity of approximately 60%. The epoxy-based compound of Example 2 in Table I was post-cured at 160° C. The high molecular weight and aliphatic structure of the Heloxy 84 rendered the compound slow to cure at 120° C. It will be noted that Heloxy 84 is not a diepoxide like the other epoxides used; rather, it is a trifunctional polyepoxide.

Referring to the epoxy-based compounds of Table I, melting temperatures for each epoxy-based compounds of Examples 1–5 were measured nine days after formulation and are recited in column 6. Shore A durometer hardness values were obtained in accordance with "Indentation Hardness of Rubber and Plastics by Means of a Durometer" of ASTM D2240 for Examples 1–5 and are recited in column 7. Notably, none of the melting temperatures exceeded about 45° C., and each of the hardness values was far less than 100 Shore A. Of particular interest is Example 5, which paired a rigid resin with ED-4000, while Example 4 paired a semi-rigid resin with ED-4000. Example 5 demonstrates that the properties of ED-4000, which has a much higher molecular weight than Epon 828, dominated to impart flexibility and solidity to the prepolymer and ultimately to the epoxy-based compound.

TABLE I

TEST RESULTS WITHIN SCOPE OF INVENTION - LATENT CURING AGENTS

| Example Number | Polyepoxide Resin | Diamine | Prepolymer Description | Composition of Epoxy-Based Compound, pbw[1] | | | Epoxy-Based Compound Melting Point, ° C. (° F.) | Epoxy-Based Compound Shore A Hardness |
| --- | --- | --- | --- | --- | --- | --- | --- | --- |
| | | | | Prepolymer | R972[2] | AH-122 | | |
| 1 | Heloxy 67 | ED-4000 | waxy solid | 24.0 | 0.5 | 6.2 | 39 (102) | 82 |
| 2 | Heloxy 84 | ED-4000 | soft waxy solid | 25.0 | 0.5 | 3.5 | 45 (113) | 45 |
| 3 | DER 736 | ED-4000 | waxy solid | 25.4 | 0.5 | 5.9 | 41 (106) | 75 |
| 4 | NC-514 | ED-4000 | waxy solid | 24.0 | 0.5 | 4.1 | 40 (104) | 36 |
| 5 | Epon 828[3] | ED-4000 | waxy solid | 25.4 | 0.5 | 5.9 | 40 (104) | 40 |

[1]Parts-by-weight
[2]Aerosil R972
[3]Epon 828 is a diglycidyl ether of Bisphenol A with an epoxy e4uivalent weight of about 185 to 192, which is commercially available from Shell Chemical Company, Houston, Texas.

TABLE II

TEST RESULTS WITHIN SCOPE OF INVENTION - KETIMINE CURING AGENTS

| Example Number | Polyepoxide Resin | Diamine | Prepolymer Description | Composition of Epoxy-Based Compound, pbw[1] | | Epoxy-Based Compound Melting Point, ° C. (° F.) | Epoxy-Based Compound Shore A Hardness |
| --- | --- | --- | --- | --- | --- | --- | --- |
| | | | | Prepolymer | Ketimine | | |
| 6 | Heloxy 67 | ED-4000 | waxy solid | 25 | 2.6 (H-1) | 39 (102) | 82 |
| 7 | Heloxy 67 | ED-4000 | waxy solid | 25 | 2.8 (H-2) | 39 (102) | 82 |
| 8 | Heloxy 67 | ED-4000 | waxy solid | 25 | 5.0 (H-3) | 39 (102) | 82 |
| 9 | DER 736 | ED-4000 | waxy solid | 25 | 2.4 (H-1) | 41 (106) | 78 |
| 10 | Epon 828[2] | ED-4000 | waxy solid | 25 | 2.4 (H-1) | 40 (104) | 85 |
| 11 | NC-514 | ED-4000 | waxy solid | 25 | 1.8 (H-1) | 40 (104) | 80 |

[1]Parts-by-weight
[2]Epon 828 is a diglycidyl ether of Bisphenol A with an epoxy equivalent weight of about 185 to 192, which is commercially available from Shell Chemical Company, Houston, Texas.

EXAMPLES 12–14

The following Examples 12–14 are provided for comparison purposes, in that a product having the desired properties could not be prepared:

Example 12: Shell Epon 1001 (mw=1000) (diglycidyl ether of (poly)Bisphenol-A) reacted with ED-4000 to produce a viscous liquid.

Example 13: Cardolite NC-547 (mw=1800) (polyglycidyl ether of cardanol-novalac) reacted with ED-4000 to produce a viscous liquid.

Example 14: Shell Epon 872 (mw=1400) (adduct of two moles of Bisphenol A with one mole of linoleic dimer acid) reacted with ED-4000 to produce a viscous liquid.

Epon 1001, NC-547, and Epon 872 in Examples 12–14 will not work because their molecular weights are too high to mask their non-aliphatic nature. By the time 4 moles of resin have been added per mole of diamine, the prepolymer partakes too much of the properties of the aromatic ring structure of the resin instead of the paraffinic nature of the PTMEG diamine. The same finding holds true for any aromatic- or cycloaliphatic-based polyepoxide with a molecular weight greater than about 1000.

Catalytic latent curatives, such as PN-23, MY-24, or Ancamine 2014 do not cure most prepolymers of the present invention that are based on aliphatic epoxy resins (e.g., DER 732, DER 736, Heloxy 84). Also, Heloxy 67-based prepolymers are not compatible with these curatives, as they are soluble in Heloxy 67 and will thus cure at room temperature.

Due to the hydrophilic nature of the diamine, ketimine cures appear to work with all of the compositions tested.

Thus, it has been demonstrated that epoxy-based compounds formulated in accordance with the present invention are solid at room temperature and are flexible, as measured by a Shore A durometer value not exceeding about 100 at room temperature.

INDUSTRIAL APPLICABILITY

The cured epoxy-based compositions of the invention are solid and flexible across wide ranges of temperatures. Furthermore, in an uncured state, the present one-component compositions are Theologically stable at room temperature for time periods measured in weeks or even months. Given these qualities, the epoxy-based compositions of the invention may be successfully employed in numerous industrial applications, particularly all variations of electronic packaging such as bonding, potting, encapsulation, conformal coating, and wire jacketing. In particular, it is contemplated that epoxy-based composition cured by way of latent curing agents at elevated temperatures will find application as molding compounds suitable for reaction injection molding, reactive extrusion, or compression molding, as well as both supported and unsupported film adhesives. Epoxy-based compositions employing ketimine curing agents are contemplated to find application as hot melt adhesives or coatings.

Thus, there has been disclosed a composition and a method for making epoxy-based compounds that are solid at room temperature, flexible, and easily processible. It will be readily apparent to those of ordinary skill in this art that various changes and modifications of an obvious nature may be made, and all such changes and modifications are considered to fall within the scope of the invention, as defined by the appended claims.

What is claimed is:

1. A flexible polyepoxide resin composition comprising a combination of the following components:

(a) an epoxy-terminated prepolymer formed by reacting at least four moles of a polyepoxide resin with approximately one mole of a diamine compound, at least one of said polyepoxide resin and said diamine compound being solid at room temperature, wherein said epoxy-terminated prepolymer is rheologically stable and solid at room temperature; and (b) a substantially stoichiometric amount of at least one ketimine curing agent, wherein said flexible polyepoxide resin composition exhibits a durometer Shore A of less than about 100.

2. The flexible polyepoxide resin composition of claim 1 wherein said diamine compound is solid at room temperature and wherein said polyepoxide resin is either liquid or solid at room temperature.

3. The flexible polyepoxide resin composition of claim 2 wherein said diamine compound pound has a weight average molecular weight of at least about 2000 and said polyepoxide resin has a molecular weight of less than half that of said diamine.

4. The flexible polyepoxide resin composition of claim 3 wherein said diamine compound consists essentially of a diprimary amine of polytetramethyl ether glycol having a weight average molecular weight in the range of about 2000 to 4000.

5. The flexible polyepoxide resin composition of claim 3 wherein said polyepoxide resin is selected from the group consisting of the difunctional epoxy of cardanol, the polyglycidyl ether of an aliphatic polyol, the diglycidyl ether of 1,4-butanediol, and the diglycidyl ether of polyoxypropylene glycol.

6. The flexible polyepoxide resin composition of claim 2 wherein said diamine compound is solid at room temperature and said polyepoxide resin is liquid at room temperature.

7. The flexible polyepoxide resin composition of claim 1 wherein said ketimine curing agent is selected from the group consisting of a ketimine of diethylene triamine and methyl iso-butyl ketone, a ketimine of ethylene diamine and methyl iso-butyl ketone, and a ketimine of methyl iso-butyl ketone and an adduct of diethylene triamine and phenyl glycidyl ether.

8. The flexible ployepoxide resin composition of claim 1 further comprising at least one component selected from the group consisting of a thixotropic agent, a diluent, a filler, an anti-oxidant, and processing aids.

* * * * *